US012681798B2

(12) United States Patent     (10) Patent No.:   US 12,681,798 B2

Benhammadi     (45) Date of Patent:    Jul. 14, 2026

(54) CONFIGURATION METHOD OF A MICROCONTROLLER

(71) Applicant: STMicroelectronics International N.V., Geneva (CH)

(72) Inventor: Jawad Benhammadi, Pont de Claix (FR)

(73) Assignee: STMicroelectronics International N.V, Geneva (CH)

( * ) Notice: Subject to any disclaimer, the term of this patent is extended or adjusted under 35 U.S.C. 154(b) by 0 days.

(21) Appl. No.: 18/939,193

(22) Filed: Nov. 6, 2024

(65) Prior Publication Data

US 2025/0165336 A1     May 22, 2025

(30) Foreign Application Priority Data

Nov. 17, 2023    (FR) ...................................... 2312642

(51) Int. Cl.
| | |
|---|---|
| *G06F 11/00* | (2006.01) |
| *G06F 9/4401* | (2018.01) |
| *G06F 11/07* | (2006.01) |
| *G06F 11/10* | (2006.01) |

(52) U.S. Cl.
CPC ........ *G06F 11/0793* (2013.01); *G06F 9/4403* (2013.01); *G06F 9/441* (2013.01); *G06F 11/1004* (2013.01)

(58) Field of Classification Search
CPC ...... G06F 11/0793; G06F 21/57; G06F 21/81; G06F 21/554; G06F 9/4403; G06F 9/441
See application file for complete search history.

(56) References Cited

U.S. PATENT DOCUMENTS

| | | | | |
|---|---|---|---|---|
| 5,826,075 A | * | 10/1998 | Bealkowski | ........ G06F 11/1433 |
| | | | | 713/1 |
| 2006/0050568 A1 | | 3/2006 | Kao et al. | |
| 2012/0102334 A1 | * | 4/2012 | O'Loughlin | .......... H04L 9/3252 |
| | | | | 713/189 |
| 2022/0413748 A1 | * | 12/2022 | Senoo | .................... G11C 16/20 |
| 2024/0176705 A1 | * | 5/2024 | Gupta | ................ G06F 11/1446 |

FOREIGN PATENT DOCUMENTS

| | | |
|---|---|---|
| CN | 106774633 A | 5/2017 |
| CN | 115079803 A | 9/2022 |

OTHER PUBLICATIONS

Wikipedia, "Phase-change memory" (Year: 2011).*
Wikipedia, "Magnetroresistive RAM" (Year: 2021).*

* cited by examiner

*Primary Examiner* — Bryce P Bonzo
*Assistant Examiner* — Gabriella Kanani Shelton
(74) *Attorney, Agent, or Firm* — Seed IP Law Group LLP

(57) ABSTRACT

The present description concerns a method of configuration of a microcontroller provided with a non-volatile memory, wherein, during an implementation of an operation of loading of the microcontroller configuration based on data from the non-volatile memory, if a fault is detected, then a new configuration loading operation is implemented at least once without for the microcontroller to be powered off.

22 Claims, 2 Drawing Sheets

CONFIGURATION METHOD OF A MICROCONTROLLER

CROSS-REFERENCE TO RELATED APPLICATION(S)

This application claims the priority benefit of French patent application number FR2312642, filed on Nov. 17, 2023, entitled "Procédé de configuration d'un microcontrôleur".

BACKGROUND

Technical Field

The present description generally concerns methods for configuring microcontrollers as well as microcontrollers implementing these methods.

Description of the Related Art

During their powering up, many electronic circuits, such as microcontrollers, start with a configuration phase based on parameters stored in a memory.

This memory is potentially sensitive to external factors such as temperature or magnetic fields. This sensitivity can generate faults during the configuration phase, which are used during attacks.

BRIEF SUMMARY

There exists a need to ensure an optimum security during the microcontroller configuration phase, while limiting the impact on the user experience.

An embodiment overcomes all or part of the disadvantages of known methods.

An embodiment provides a method of configuration of a microcontroller provided with a non-volatile memory, wherein, during an implementation of an operation of loading of a configuration of the microcontroller based on data from the non-volatile memory, if a fault is detected, then a new configuration loading operation is implemented at least once without for the microcontroller to be powered off.

An embodiment provides a microcontroller provided with a non-volatile memory, wherein, during an implementation of an operation of loading of a microcontroller configuration based on data from the non-volatile memory, if a fault is detected, then a new configuration loading operation is implemented at least once without for the microcontroller to be powered off.

According to an embodiment, if, during the implementation of an operation of loading of a microcontroller configuration from the non-volatile memory, no fault is detected, then a microcontroller boot procedure is implemented.

According to an embodiment, a counter is incremented at each new consecutive implementation of said loading operation linked to a fault detection.

According to an embodiment, when the counter exceeds a threshold N, then the microcontroller is set to a locking mode.

According to an embodiment, from the time when the microcontroller has been set to the locking mode, then only a powering off of the microcontroller enables for a new operation of loading of a configuration of a microcontroller from the non-volatile memory to be implemented.

According to an embodiment, the fault detection is implemented by comparison of error correction codes.

According to an embodiment, the fault detection is implemented by comparison of cyclic redundancy codes.

According to an embodiment, the fault detection is implemented based on data from the non-volatile memory.

According to an embodiment, the fault detection is implemented by a memory interface of the microcontroller.

According to an embodiment, the non-volatile memory is a MRAM-type memory.

According to an embodiment, the non-volatile memory is a memory of phase change type.

BRIEF DESCRIPTION OF THE SEVERAL VIEWS OF THE DRAWINGS

The foregoing features and advantages, as well as others, will be described in detail in the rest of the disclosure of specific embodiments given as an illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For clarity, only those steps and elements which are useful to the understanding of the described embodiments have been shown and are described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, where reference is made to absolute position qualifiers, such as "front", "back", "top", "bottom", "left", "right", etc., or relative position qualifiers, such as "top", "bottom", "upper", "lower", etc., or orientation qualifiers, such as "horizontal", "vertical", etc., reference is made unless otherwise specified to the orientation of the drawings.

Unless specified otherwise, the expressions "about", "approximately", "substantially", and "in the order of" signify plus or minus 10%, preferably of plus or minus 5%.

Figure 1:
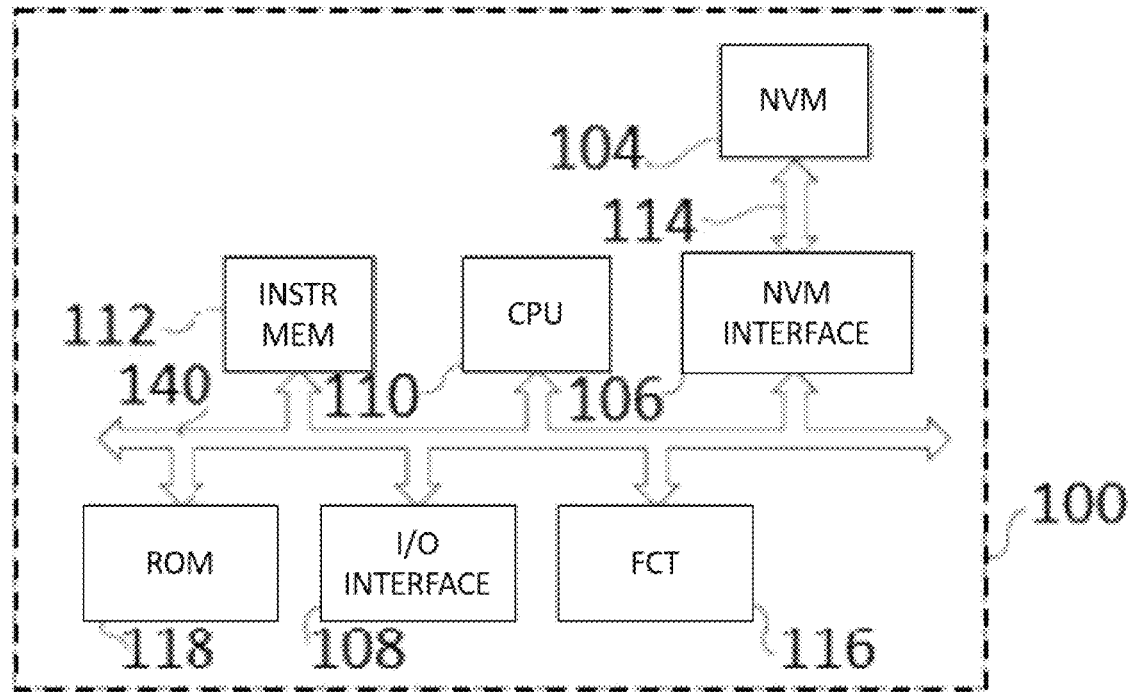
FIG. 1 shows, very schematically and in the form of blocks, an example of a microcontroller of the type to which the described embodiments apply.

FIG. 1 shows, very schematically and in the form of blocks, an example of a microcontroller 100 of the type to which the described embodiments apply.

Microcontroller 100 comprises a non-volatile memory 104 (NVM), for example of FLASH or MRAM or phase-change memory type, capable of communicating, via a communication bus 114, with a non-volatile memory interface 106 (MEM INTERFACE) configured to write or read data into and from non-volatile memory 104.

Microcontroller 100 further comprises, for example, a processing unit 110 (CPU) comprising one or a plurality of processors under control of instructions stored in an instruction memory 112 (INSTR MEM). Instruction memory 112 is, for example, a volatile memory of random access (RAM) type. Processing unit 110 and memory 112 communicate, for example, via a system (data, address, and control) bus 140. Memory 104 is coupled to system bus 140 via non-volatile memory interface 106 and via bus 114. Device 100 further comprises an input/output interface 108 (I/O interface) coupled to system bus 140 to communicate with the outside.

Microcontroller 100 may integrate other circuits implementing other functions (for example, one or a plurality of volatile and/or non-volatile memories, or other processing units), symbolized by a block 116 (FCT) in FIG. 1. Among these other circuits, microcontroller 100 comprises, for example, a read-only or static memory 118 (ROM).

During its powering up, the microcontroller implements a phase, in other words an operation, of configuration (OBL, Option Byte Loading) based on parameters, for example user option bytes, stored in a memory. During this configuration phase, configuration parameters are loaded from memory 104 to, for example, processing unit 110.

Memory 104 is for example sensitive to temperature or to an external magnetic field, which may affect the cycling, but also the programming or the reading. Attacks by hackers may also take advantage of this sensitivity to modify the configuration of microcontroller 100. The configuration phase, which depends on data originating from memory 104, is thus particularly critical and should be secured. A solution would be to lock the microcontroller operation as soon as a fault is detected during the configuration phase, and to only allow the unlocking of microcontroller 100 after the latter has been powered off. This solution however has the disadvantage of degrading the user experience if the fault is only temporary and not linked to an attack.

The described embodiments provide that, during an implementation of an operation of loading of a microcontroller configuration based on data from non-volatile memory 104, if a fault is detected, then a new configuration loading operation is implemented at least once.

This allows, if a temporary disturbance causes a fault during the configuration operation, the microcontroller to then restart the configuration loading operation without for the user to necessarily power off the microcontroller.

This further enables to preserve the security of the configuration loading operation, since the microcontroller does enter a boot phase if a fault is detected.

Figure 2:
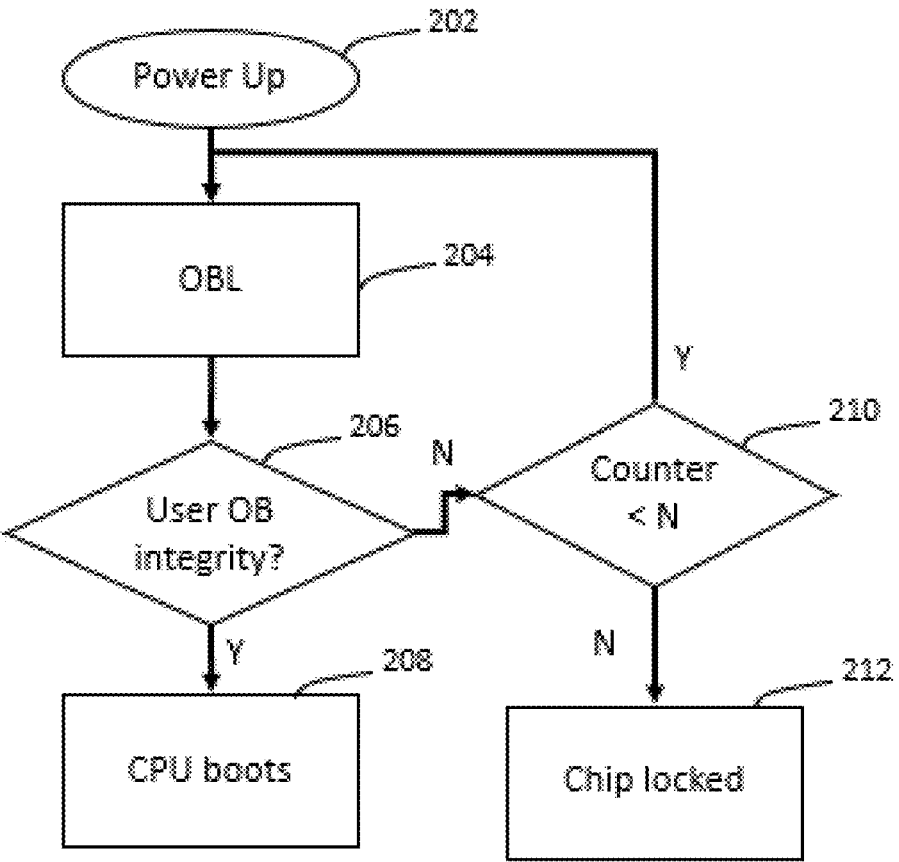
FIG. 2 shows in the form of blocks a method of configuration of the microcontroller of FIG. 1.

FIG. 2 shows in the form of blocks a method of configuration of the microcontroller of FIG. 1.

During a first step 202 (Power up), microcontroller 100 is powered up.

In a subsequent step 204 (OBL), the configuration loading operation is for example implemented by memory interface 106 to load the configuration data, for example in the form of bytes, of microcontroller 100.

At a step 206 (User OB integrity?), subsequent to step 204, a fault detection operation of the configuration loading operation is implemented, for example via memory interface 106. In an example, step 206 consists in checking the integrity, or the matching, of error-correction codes or of cyclic redundancy codes linked to the loaded user option bytes.

If no fault is detected (branch Y), then a step 208 (CPU boots) is carried out. During this step 208, a method of booting microcontroller 100 is implemented, for example with processing unit 110 and/or by loading and executing boot programs in memory 104.

If a fault is detected (branch N), then a step 210 (Counter <N) is carried out. During this step 210, a counter, for example implemented in memory interface 106, is incremented at each consecutive restarting of the configuration loading operation linked to the detection of a fault. When the value of the counter exceeds a threshold N, for example N=2 to 10, then a step 212 (Chip locked) is performed. If the counter value is lower than the threshold (Y branch), then the method restarts at step 204 for a new configuration loading operation without for a powering off to be needed.

During this step 212, the microcontroller is set to a locking mode. In this mode, the microcontroller is for example no longer accessible in read or write mode, and for example no longer performs any tasks. In this mode, only a powering off, for example by disconnection of a battery powering microcontroller 100, will enable to return to step 202.

The method disclosed in FIG. 2 enables to repeat the configuration loading operation, without powering off microcontroller 100 as long as a fault is detected, and this, to reach the predetermined number of repetitions N. This case for example corresponds to transient faults which are not linked to an attack. If a fault or faults are still detected despite the fact that the configuration loading operation is repeated several times consecutively, then it may be an attack and the microcontroller will be set to the locking mode so that it can be secured and that secrets, such as encryption keys, cannot be revealed.

The value of threshold N may be selected according to the robustness to attacks or to external physical parameters. Thus, if N=2, an attack will be stopped very rapidly, but this will rapidly lock the microcontroller in case of a relatively long temporary disturbance. The higher N will be, the longer the attack can last, but the more it will be possible to give way to an external disturbance without having to power off microcontroller 100.

Various embodiments and variants have been described. Those skilled in the art will understand that certain features of these various embodiments and variants may be combined, and other variants will occur to those skilled in the art. In particular, the fault detection during step 206 may consist in the checking of values other than those linked to user option bytes, or the use of error checking methods other than error correction codes or other than cyclic redundancy codes.

Finally, the practical implementation of the described embodiments and variants is within the abilities of those skilled in the art based on the functional indications given hereabove. In particular, even though the method has been described in the case of a microcontroller, those skilled in the art will be capable of using their knowledge to apply this method to other types of electronic circuits such as systems on chip (SOCs) using a configuration phase based on data stored in a memory.

Method of configuration of a microcontroller (100) provided with a non-volatile memory (104), can be summarized as including, during an implementation of an operation of loading of the configuration of the microcontroller (100) based on data from the non-volatile memory (104), if a fault is detected, then a new configuration loading operation is carried out at least once without for the microcontroller to be powered off.

Microcontroller (100) provided with a non-volatile memory (104), can be summarized as including, during an implementation of an operation of loading of the microcontroller configuration based on data from the non-volatile memory (104), if a fault is detected, then a new configuration loading operation is implemented at least once without for the microcontroller to be powered off.

If, during the implementation of an operation of loading of the microcontroller configuration from the non-volatile memory (104), no fault is detected, then a method of booting the microcontroller may be implemented.

A counter can be incremented at each new consecutive implementation of said loading operation linked to a fault detection.

When the counter exceeds a threshold N, then the microcontroller can be set to a locking mode.

From the time when the microcontroller has been set to the locking mode, then only a powering off of the microcontroller can enable for a new operation of loading of a configuration of the microcontroller (100) from the non-volatile memory (104) to be implemented.

The fault detection can be implemented by comparison of error correction codes (ECC).

The fault detection can be implemented by comparison of cyclic redundancy codes (CRC).

The fault detection can be implemented based on data from the non-volatile memory (104).

The fault detection can be implemented by a memory interface (106) of the microcontroller (100).

The non-volatile memory (104) can be a MRAM-type memory.

The non-volatile memory (104) can be a memory of phase change type.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of configuration of a microcontroller provided with a non-volatile memory, comprising:
  during an implementation of an operation of loading of the a configuration of the microcontroller based on data from the non-volatile memory:
    responsive to detecting a fault, restarting the operation of loading the configuration at least once without needing for the microcontroller to be powered off; and
    responsive to restarting the operation of loading the configuration a threshold number of times, setting the microcontroller to be inaccessible in read or write mode.

2. The method according to claim 1, wherein during the implementation of an operation of loading of the microcontroller configuration from the non-volatile memory, responsive to no fault detected, a method of booting the microcontroller is implemented.

3. The method according to claim 1, wherein a counter is incremented at each new consecutive implementation of the loading operation linked to a fault detection.

4. The method according to claim 3, wherein, when the counter exceeds a threshold N, the microcontroller is set to a locking mode.

5. The method according to claim 4, wherein, from the time when the microcontroller has been set to the locking mode, only a powering off of the microcontroller enables a new operation of loading of a configuration of the microcontroller from the non-volatile memory to be implemented.

6. The method according to claim 1, wherein detecting the fault is implemented by comparison of error correction codes (ECCs).

7. The method according to claim 1, wherein detecting the fault is implemented by comparison of cyclic redundancy codes (CRCs).

8. The method according to claim 1, wherein detecting the fault is implemented based on data from the non-volatile memory.

9. The method according to claim 8, wherein detecting the fault is implemented by a memory interface of the microcontroller.

10. The method according to claim 1, wherein the non-volatile memory is a MRAM-type memory.

11. The method according to claim 1, wherein the non-volatile memory is a memory of phase change type.

12. A microcontroller provided with a non-volatile memory, wherein the microcontroller is configured to:
  during an implementation of an operation of loading of a configuration of the microcontroller based on data from the non-volatile memory:
    responsive to detecting a fault, cause restarting the operation of loading the configuration at least once without needing for the microcontroller to be powered off; and
    responsive to restarting the operation of loading the configuration a threshold number of times, cause the microcontroller to be inaccessible in read or write mode.

13. The microcontroller according to claim 12, wherein during the implementation of an operation of loading of the microcontroller configuration from the non- volatile memory, responsive to no fault detected, a method of booting the microcontroller is implemented.

14. The microcontroller according to claim 12, wherein a counter is incremented at each new consecutive implementation of the loading operation linked to a fault detection.

15. The microcontroller according to claim 14, wherein, when the counter exceeds a threshold N, the microcontroller is set to a locking mode.

16. The microcontroller according to claim 15, wherein, from the time when the microcontroller has been set to the locking mode, only a powering off of the microcontroller enables a new operation of loading of a configuration of the microcontroller from the non-volatile memory to be implemented.

17. The microcontroller according to claim 12, wherein detecting the fault is implemented by comparison of error correction codes (ECCs).

18. The microcontroller according to claim 12, wherein detecting the fault is implemented by comparison of cyclic redundancy codes (CRCs).

19. The microcontroller according to claim 12, wherein detecting the fault is implemented based on data from the non-volatile memory.

20. The microcontroller according to claim 19, wherein detecting the fault is implemented by a memory interface of the microcontroller.

21. The microcontroller according to claim 12, wherein the non-volatile memory is a MRAM-type memory.

22. The microcontroller according to claim 12, wherein the non-volatile memory is a memory of phase change type.

* * * * *